(12) United States Patent
Mille et al.

(10) Patent No.: US 9,934,023 B2
(45) Date of Patent: Apr. 3, 2018

(54) REMOTE DISTRIBUTION OF A SOFTWARE UPDATE TO REMOTE-READING TERMINALS

(71) Applicant: GrDF, Paris (FR)

(72) Inventors: Michaël Mille, Bû (FR); Robert Lacoste, Chaville (FR); Alexandre Vialle, Paris (FR)

(73) Assignee: Gaz Réseau Distribution France (GrDF), Paris (FR)

( * ) Notice: Subject to any disclaimer, the term of this patent is extended or adjusted under 35 U.S.C. 154(b) by 0 days.

(21) Appl. No.: 15/108,277

(22) PCT Filed: Dec. 23, 2014

(86) PCT No.: PCT/FR2014/053534
§ 371 (c)(1),
(2) Date: Jun. 24, 2016

(87) PCT Pub. No.: WO2015/097406
PCT Pub. Date: Jul. 2, 2015

(65) Prior Publication Data
US 2016/0306620 A1    Oct. 20, 2016

(30) Foreign Application Priority Data

Dec. 26, 2013  (FR) ..................... 13 63579

(51) Int. Cl.
*G06F 9/445*    (2006.01)
*G01D 4/00*    (2006.01)
(Continued)

(52) U.S. Cl.
CPC .............. *G06F 8/65* (2013.01); *G01D 4/004* (2013.01); *G06F 8/60* (2013.01); *H04L 41/0806* (2013.01);
(Continued)

(58) Field of Classification Search
CPC ..... G06F 8/65; G06F 8/68; G06F 8/61; G06F 8/60
See application file for complete search history.

(56) References Cited

U.S. PATENT DOCUMENTS 8,320,302 B2 * 11/2012 Richeson ............. H04M 11/002
370/328
8,391,158 B2 *  3/2013 Gupta ................. H04J 11/0093
370/241
(Continued)

FOREIGN PATENT DOCUMENTS

EP         2661050 A1    11/2013
EP         2663089 A1    11/2013
WO   WO 2005/016890 A1    2/2005

OTHER PUBLICATIONS

Justin Samue et al.; Survivable Key Compromise in Software Update Systems; 2010 ACM; pp. 61-72; <https://dl.acm.org/citation.cfm?id=1866315>.*

(Continued)

*Primary Examiner* — Thuy Dao
*Assistant Examiner* — Cuong V Luu
(74) *Attorney, Agent, or Firm* — Finnegan, Henderson, Farabow, Garrett & Dunner LLP

(57) ABSTRACT

A method of managing a software update of a plurality of remote-reading terminals to be updated in a remote-reading installation comprising a plurality of access points and a management server is disclosed, The method may include steps of transmitting a message for planning reception of the update data to said plurality of remote-reading terminals to be updated, selecting a set of access points from among said plurality of access points in such a way as to limit the number of access points used to disseminate said update data, and sending said update data through said selected set of access points.

10 Claims, 1 Drawing Sheet

(51) Int. Cl.
*H04Q 9/00* (2006.01)
*H04L 12/24* (2006.01)
*H04Q 9/02* (2006.01)

(52) U.S. Cl.
CPC ........... *H04L 41/0833* (2013.01); *H04Q 9/00* (2013.01); *H04Q 9/02* (2013.01); *H04Q 2209/60* (2013.01); *Y02B 90/242* (2013.01); *Y02B 90/246* (2013.01); *Y04S 20/322* (2013.01); *Y04S 20/42* (2013.01); *Y04S 20/48* (2013.01)

(56) References Cited

U.S. PATENT DOCUMENTS

| | | | | |
|---|---|---|---|---|
| 8,484,370 | B1* | 7/2013 | Coffee | H04L 69/163 709/228 |
| 2003/0093782 | A1* | 5/2003 | Ali-Santosa | G06F 8/65 717/175 |
| 2007/0192763 | A1* | 8/2007 | Helvick | G06F 8/65 717/168 |
| 2008/0259844 | A1 | 10/2008 | Richeson et al. | |
| 2008/0263535 | A1* | 10/2008 | Dias | G06F 8/67 717/168 |
| 2010/0020710 | A1* | 1/2010 | Gupta | H04J 11/0093 370/252 |
| 2012/0060152 | A1* | 3/2012 | Oh | G06F 8/665 717/170 |
| 2012/0078547 | A1 | 3/2012 | Murdoch | |
| 2012/0198435 | A1* | 8/2012 | Dirstine | G06F 8/65 717/173 |
| 2012/0311556 | A1* | 12/2012 | Matsukawa | G06F 8/665 717/171 |
| 2014/0223424 | A1* | 8/2014 | Han | G06F 8/665 717/173 |

OTHER PUBLICATIONS

Jinsik Kim et al.; Remote Progressive Firmware Update for Flash-Based Networked Embedded Systems; 2009 ACM; pp. 407-412; <https://dl.acm.org/citation.cfm?id=1594337&CFID=824151054&CFTOKEN=45958257>.*

Jeff Arnold; Ksplice Automatic Rebootless Kernel Updates; 2009 EuroSys; pp. 187-198; <https://dl.acm.org/citation.cfm?id=1519085&CFID=824151054&CFTOKEN=45958257>.*

Ryozo Kiyohara et al.; Method for Fast Compression of Program Codes for Remote Updates in Embedded Systems; 2009 ACM; pp. 1683-1684; <https://dl.acm.org/citation.cfm?id=1529659&CFID=824151054&CFTOKEN=45958257>.*

Sangho Yi et al.; Arbiter-Recall a New Function Update Scheme by Arbitration between a Remote Call and a Dynamic Update for Wireless Sensor Networks; 2009 ACM; pp. 339-340; <https://dl.acm.org/citation.cfm?id=1529355&CFID=824151054&CFTOKEN=45958257>.*

Christopher M. Hayden et al.; Kitsune Efficient General-Purpose Dynamic Software Updating for C; 2014 ACM; 38 pages; <https://dl.acm.org/citation.cfm?id=2629460&CFID=824151054&CFTOKEN=45958257>.*

International Search Report of International Application No. PCT/FR2014/053534 dated Apr. 16, 2015.

* cited by examiner

REMOTE DISTRIBUTION OF A SOFTWARE UPDATE TO REMOTE-READING TERMINALS

CROSS REFERENCE TO RELATED APPLICATIONS

This application is a national stage entry of International Application No. PCT/FR2014/053534 filed on Dec. 23, 2014, and claims priority to and the benefit of the filing date of French Patent Application No. 1363579, filed on Dec. 26, 2013, the entire contents of which are incorporated by reference herein.

The present invention relates to the management of updates in a remote-reading installation. It relates more particularly to a method of managing software updates of remote-reading terminals of a remote-reading installation.

A remote-reading installation conventionally comprises several remote-reading terminals, for example smart water or gas meters, able to meter consumption and also to transmit information resulting from various readings (temperature, pollution, etc.). The data transmitted by the remote-reading terminals, pass through access points, generally by radio link. These access points, then allow the uploading of the information to a server for managing the remote-reading installation, to which they are connected by the intermediary of a telecommunication network, for example a wired network or a wireless network, of the GPRS or other type.

The remote-reading terminals are installed in water networks, gas networks or any other network necessitating metering and measurements, mostly for a long time, generally of the order of about ten years. In order to ensure their continuous operation, even in the absence of electric current, these remote-reading terminals operate with electric accumulators. A significant problem is therefore the limitation of their electric consumption.

In order to update the software installed in these remote-reading terminals, it is known to operate remotely by transmitting the update data via the access points. However, as the radio communication means incorporated in the remote-reading terminals are relatively heavy consumers of electric energy, it is necessary to plan the transmission of these update data.

Moreover, from the patent document EP2661050, there is known a method for updating remote-reading terminals all associated with a common access point ("data collector" being the English term), which transmits an update notice to the terminals, indicating at what time the update data will be transmitted by the access point. The terminals therefore activate their radio communication means at the time indicated in the notice.

In a remote-reading installation, comprising a plurality of remote-reading terminals, and a plurality of access points, the updates are generally transmitted at the same time by all of the access points and this creates a heavy congestion of the radio spectrum and increases the risk of poor reception of the update data by the remote-reading terminals.

In areas of great concentration of remote-reading terminals, for example in large towns, this risk is significantly increased because of the possible superimposition of several quasi-simultaneous transmissions on the same frequency bands.

From the document EP2661050, there is known a solution consisting of offsetting in time the sending of the updates by the access points likely to interfere with each other. However, such a solution produces a longer congestion of the radio frequencies used. Moreover, such a solution imposes the management of several times of transmission of the updates, which tends to complicate the technical deployment of the update.

There is therefore a need to optimize the management of updates in a remote-reading installation.

In particular, there is a need for an alternative solution in order to limit the problems of interference during the sending of an update by a plurality of access points.

In order to solve this problem, the present invention proposes a method of managing a software update of a plurality of remote-reading terminals to be updated in a remote-reading installation comprising a plurality of access points, the plurality of access points being designed for communicating by radio link with the plurality of remote-reading terminals to be updated, and being designed for communicating with a management server of the remote-reading installation by the intermediary of a telecommunication network, each remote-reading terminal of the plurality of remote-reading terminals to be updated being associated with an access point access point of the plurality of access points in order to transmit remote-reading data to the management server, the method being characterized in that it comprises the steps of:

(a) transmitting a message for planning reception of update data to the plurality of remote-reading terminals to be updated by the intermediary of their associated access points, the planning message comprising a start time for the distribution of the update data;

(b) selecting a set of access points among the plurality of access points in such a way as to limit the number of access points used for distributing the update data, whilst allowing the reception of the update data by the plurality of remote-reading terminals to be updated;

(c) transmitting the update data by the selected set of access points, at the distribution start time.

The remote-reading terminals of the plurality of remote-reading terminals can be, in a non-limiting way, water meters, gas meters, electricity meters, and can also be devices for monitoring sensors, for example for monitoring pressure rates, humidity, levels, speed, acoustic sensors, sensors of conductivity, turbidity, pH measurement, measurement of H2S level. These remote-reading terminals can also, in a non-limiting way, be devices for monitoring sensors in housing and tertiary services, for example sensors for detecting intrusion, smoke or carbon monoxide.

These remote-reading terminals can also, in a non-limiting way, comprise or can be devices allowing the control of actuators, for example for closing valves in the case of leakage detection.

Advantageously, the selection made in step (b), of the set of distribution access points, makes it possible to reduce the congestion of the radio spectrum during the transmission of the update data, which also allows the reduction of the risk of poor reception of update data by the remote-reading terminals.

In particular, the selection step (b) comprises the transmission of a message of notification of the selection to each access point of the selected set of access points, the notification message comprising the distribution start time.

Advantageously, during the step (a) of transmission of the message for planning the reception of the update data, each terminal of the plurality of remote-reading terminals to be updated transmits an acknowledgement message to its associated access point, in order to confirm the planning of the reception of the update data at the distribution start time.

In particular, the step (c) of transmission of the update data by the selected set of access points is carried out several times consecutively.

Advantageously, the step (a) of transmission of the message for planning the reception of the update data is carried out, for each remote-reading terminal of the plurality of remote-reading terminals ($T_1$-$T_9$) to be updated, consecutive to the reception, by its associated access point, of remote-reading data transmitted by the remote-reading terminal.

Advantageously and in a non-limiting way, the selection step comprises the selection of the smallest number of access points making it possible to transmit the updates to all of the remote-reading terminals to be updated simultaneously, taking account, on the one hand, of the transmission range areas of the access points and, on the other hand, of the locations of the remote-reading terminals relative to these transmission range areas.

The present invention proposes moreover a remote-reading installation comprising:
- a management server;
- a plurality of remote-reading terminals to be updated;
- a plurality of access points;
- the plurality of access points being designed for communicating by radio link with the plurality of remote-reading terminals to be updated, and being designed for communicating with the management server of the remote-reading installation by the intermediary of a telecommunication network, each remote-reading terminal of the plurality of remote-reading terminals to be updated being associated with an access point of the plurality of access points for transmitting remote-reading data to the management server,
- the remote-reading installation being characterized in that:
- the management server is designed for controlling the transmission of a message for planning the reception of update data to the plurality of remote-reading terminals to be updated, by the intermediary of their associated access points, the planning message comprising an update data transmission start time;
- the management server being designed for selecting a set of access points from among the plurality of access points in such a way as to limit the number of access points used for distributing the update data, whilst allowing the reception of the update data by the plurality of remote-reading terminals to be updated;
- the set of access points selected by the management server being designed for transmitting the update data at the distribution start time.

BRIEF DESCRIPTION OF THE DRAWINGS

Other features and advantages of the invention will become apparent on reading the description given hereafter of two particular embodiments of the invention, given by way of indication and in a non-limiting way and with reference to the appended drawings in which.

DETAILED DESCRIPTION

Figure 1:
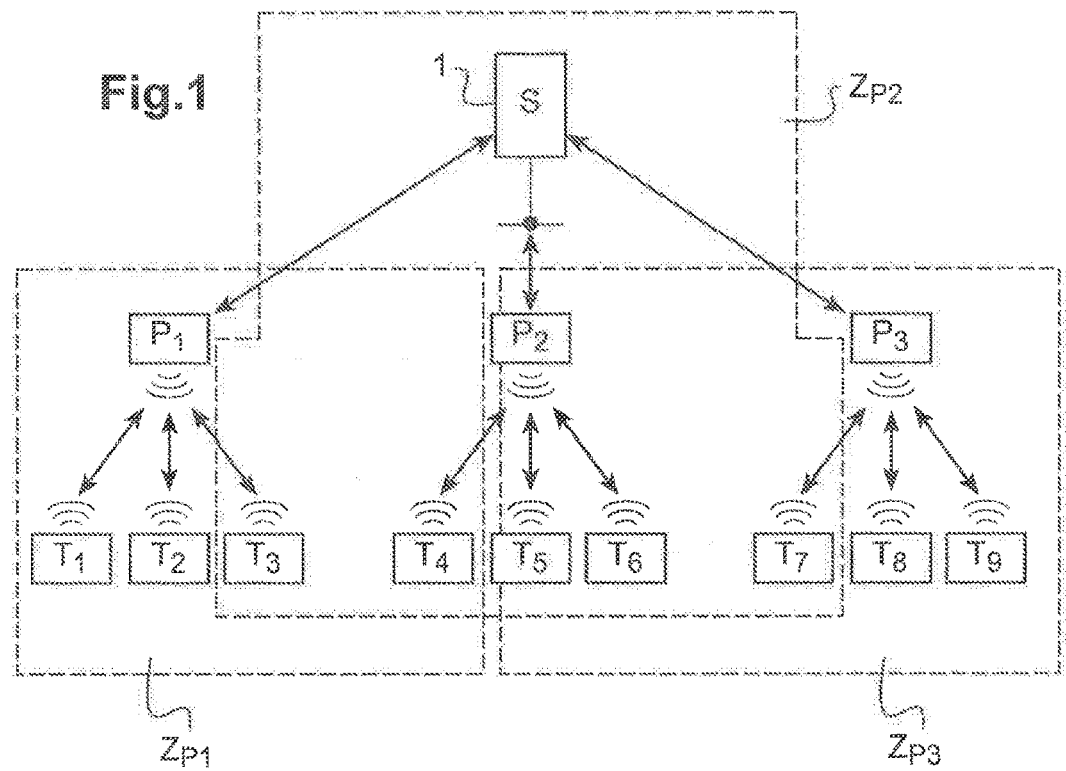
FIG. 1 shows an example of a remote-reading installation according to a first embodiment of the invention.

With reference to FIG. 1, a remote-reading installation comprises a management server 1 of the remote-reading installation.

This management server 1 communicates via a telecommunication network with three access points $P_1$, $P_2$, $P_3$ of the installation. The management server 1 comprises for example a network card for communicating with the access points $P_1$ to $P_3$, a microprocessor and an internal memory.

These access points $P_1$ to $P_3$ comprise for example a radio transceiver card and a radio antenna for communicating with remote-reading terminals $T_1$ to $T_9$ of the installation, a network card for communicating via the telecommunication network with the management server 1, a microprocessor and an internal memory.

The remote-reading installation comprises moreover a plurality of remote-reading terminals $T_1$ to $T_9$, in this embodiment nine remote-reading terminals $T_1$ to $T_9$. These remote-reading terminals $T_1$ to $T_9$ are, for example, terminals for metering the consumption of gas, installed in the gas inlet circuits of individual homes. The remote-reading terminals $T_1$ to $T_9$ comprise, for example, an electric battery, a microprocessor, an internal memory, radio communication means and means for metering the consumption of gas. The remote-reading terminals $T_1$ to $T_9$ communicate, via their radio communication means, with the access points $P_1$ to $P_3$ by a radio link. The radio communication means of the remote-reading terminals $T_1$ to $T_9$ are, from a general point of view, switched off outside of periods of transmission of remote-reading data, in order to economize the electric battery. Moreover, it is not possible at the access points $P_1$ to $P_3$ to transmit data to the remote-reading terminals $T_1$ à$T_9$, when the latter have switched off their radio communication means.

Because of the transmission range limits of the radio communication means of the remote-reading terminals $T_1$ to $T_9$ and of the transmission range limits of the radio communication means of the access points $P_1$ to $P_3$, each remote-reading terminal $T_1$ to $T_9$ of the remote-reading installation is associated with an access point $P_1$ to $P_3$, called the associated access point. All of the remote-reading terminals $T_1$ to $T_9$ associated with a common access point $P_1$ to $P_3$ form a group of remote-reading terminals.

The association of a remote-reading terminal $T_1$ to $T_9$ with an access point $P_1$ to $P_3$ can be carried out during the initializing of the remote-reading terminal $T_1$ to $T_9$.

Preferably, the association can be carried out by the election, by the management server 1, of the access point $P_1$ to $P_3$ best receiving the signal from the remote-reading terminal $T_1$ à$T_9$ in the process of initialization. For this purpose, the access points $P_1$ to $P_3$, transmit to the management server 1 an information message as soon as they pick up the signal from a new remote-reading terminal $T_1$ to $T_9$. This message comprises the reception level of the signal from the remote-reading terminal $T_1$ to $T_9$ in the process of initialization. Also, after a short waiting time, of the order of a few seconds, the management server 1 elects the access point best receiving the signals from the remote-reading terminal $T_1$ to $T_9$ in the process of initialization, and then transmits to the elected access point $P_1$ to $P_3$, an association message. The association message informs the elected access point $P_1$ to $P_3$, that the remote-reading terminal $T_1$ to $T_9$ in the process of initialization is joining the group of remote-reading terminals that are associated with it. This association message is immediately relayed by the elected access point $P_1$ to $P_3$ to the remote-reading terminal $T_1$ to $T_9$ in the process of initialization. Also, the management server 1 stores, in its memory, the association between the remote-reading terminal $T_1$ to $T_9$ and its associated access point $P_1$ to $P_3$, and stores, moreover, the list of access points $P_1$ to $P_3$ having informed of the reception of the signal from the remote-reading terminal $T_1$ to $T_9$ in the process of initialization.

At the end of this initialization phase, the management server 1 can define transmission range areas $Z_{P1}$ to $Z_{P3}$ of the access points $P_1$ to $P_3$.

In this embodiment, a first group $T_1$ to $T_3$ of remote-reading terminals is associated by the management server 1 with the first access point $P_1$, because of their presence in the transmission range area $Z_{P1}$ of the access point $P_1$. This association allows the first group of remote-reading terminals $T_1$ to $T_3$ to communicate by radio link with their associated access point $P_1$, in order to transmit remote-reading data, which can be measuring data and/or metering data, for example of the consumption of gas. These measurement and metering data are then transmitted by the associated access point $P_1$ to the management server 1 of the remote-reading installation. This association is carried out for each remote-reading terminal exclusively; a remote-reading terminal $T_1$ to $T_9$ thus always transmits its information to the same associated access point $P_1$ to $P_3$. However, a remote-reading terminal can receive data from another access point $P_1$ to $P_3$ of the remote-reading installation. An access point $P_1$ to $P_3$ communicates with a plurality of remote-reading terminals $T_1$ to $T_9$, according to instructions transmitted by the management server 1, and in a non-exclusive manner with regard to the choice of the communicating remote-reading terminals $T_1$ to $T_9$.

Similarly, a second group $T_4$ to $T_6$ of remote-reading terminals is associated with a second access point $P_2$ having a transmission range area $Z_{P2}$, and a third group $T_7$ to $T_9$ of remote-reading terminals is associated with a third access point $P_3$ having a transmission range area $Z_{P3}$.

The remote-reading terminal $T_4$ is included in the transmission range area $Z_{P1}$ of the access point $P_1$ and in the transmission range area $Z_{P2}$ of the access point $P_2$. However, it is associated with the access point $P_2$, as previously explained for the election of the associated access point during the initialization of the remote-reading terminal $T_4$.

Similarly, the remote-reading terminals $T_5$ and $T_6$ are included in the transmission range area $Z_{P2}$ of the access point $P_2$ and in the transmission range area $Z_{P3}$ of the access point $P_3$. However, they are associated with the access point $P_2$, as explained previously for the election of the associated access point during the initialization of the remote-reading terminal $T_4$.

The management server 1 receives update data for remote-reading terminals, provided by the manufacturer of the remote-reading terminals to be updated. The management server 1 determines for which remote-reading terminals $T_1$ to $T_9$ these update data are intended. In order to do this, the management server 1 has in its internal memory information relative to each remote-reading terminal $T_1$ to $T_9$ of the remote-reading installation. In particular, the management server 1 stores, for each remote-reading terminal $T_1$ to $T_9$, the manufacturer of the terminal, the model and the current version of the internal software, also referred to by the English term "firmware". These data will allow the management server 1 to identify the list of remote-reading terminals among $T_1$ to $T_9$, to which the update is applicable. In this example of embodiment, the software update is applicable to all of the remote-reading terminals $T_1$ to $T_9$; the remote-reading terminals $T_1$ to $T_9$ to be updated are therefore referred to. It is obvious to those skilled in the art to reduce the list of terminals of the installation to a list of only those terminals to which the update applies, for example by ignoring possible remote-reading terminals $T_1$ to $T_9$ to which the update does not apply.

The management server 1 will then establish the list of the access points $P_1$ to $P_3$ associated with the remote-reading terminals $T_1$ to $T_9$ to be updated. In this example, the list of the access points associated with the remote-reading terminals $T_1$ to $T_9$ corresponds to all of the access points $P_1$ to $P_3$ of the installation.

The management server 1 will then transmit a message to all of the access points $P_1$ to $P_3$ associated with the remote-reading terminals $T_1$ to $T_9$ to be updated. This message instructs the associated access points $P_1$ to $P_3$ to transmit a message planning the reception of update data to the remote-reading terminals $T_1$ to $T_9$ to be updated, this message comprising a predetermined start time for the distribution of the update data. The start time for the distribution of update data can be encapsulated in the planning message as a timestamp value, "timestamp" being the English term. This predetermined time indicates to the remote-reading terminal the time at which it must switch on its radio communication means in order to receive the update data.

In order that the system may function in a consistent manner, the management server 1, sees to it that the access points $P_1$ à $P_3$ and the remote-reading terminals $T_1$ to $T_9$ of the installation are synchronized on the same time schedule, which is something well known to those skilled in the art.

Because of the switching off of the radio communication means of the remote-reading terminals $T_1$ to $T_9$, outside of the times when they must transmit their remote-reading data, it is not possible, for the access points $P_1$ to $P_3$, to transmit immediately the message planning the reception of update data to the remote-reading terminals $T_1$ to $T_9$ to be updated.

Moreover, the access points $P_1$ to $P_3$, wait to receive remote-reading data coming from a remote-reading terminal $T_1$ to $T_9$, in order to transmit the planning message to it, if the update is applicable to that terminal. In fact, the remote-reading terminals $T_1$ to $T_9$ keep their radio communication means switched on for a short period after a transmission of remote-reading data, for the purpose of receiving a message coming from an access point $P_1$ to $P_3$.

Advantageously, this short period of waiting for a message can range from 1 second to 60 seconds. At the end of this short waiting period, the remote-reading terminals $T_1$ to $T_9$, switch off their radio communication means until the next transmission of remote-reading data.

When a remote-reading terminal $T_1$ to $T_9$ to be updated, transmits remote-reading data to its associated access point $P_1$ to $P_3$, the latter transmits to it, at the end of the reception of the remote-reading data, the planning message initially transmitted by the management server 1, thus taking advantage of the short waiting period following the transmission of the remote-reading data, whilst the radio communication means of remote-reading terminal $T_1$ to $T_9$ remain active.

The remote-reading terminal $T_1$ to $T_9$ then transmits an acknowledgement message to its associated access point $P_1$ to $P_3$, in order to confirm the taking into account of the planning message and to confirm the waiting, at the distribution start time, for the reception of the update data. In other words, the acknowledgement message confirms the planning of the reception of the update data at the distribution start time.

The access point $P_1$ to $P_3$, then transmits a message to the management server 1 in order to indicate that the planning message has actually been transmitted to the remote-reading terminal $T_1$ to $T_9$.

The management server 1 then proceeds with the selection of a set of access points, called distribution access points, among the plurality of access points $P_1$ to $P_3$. The term "set" is understood to be at least one access point $P_1$ to $P_3$ The selected distribution will be used for transmitting the update data at o the predetermined distribution of the update data start time. The server will select these distribution access points from among the plurality of access points $P_1$ to $P_3$ of the installation, as a function of the remote-reading terminals $T_1$ to $T_9$ to be updated, and as a function of the transmission range areas of the access points $P_1$ to $P_3$. Advantageously, the management server 1, selects the smallest number of access points among the plurality of access points $P_1$ to $P_3$ making it possible to transmit the updates to all of the remote-reading terminals $T_1$ to $T_3$ to be updated. In other words, the set constituted by the minimum number of access points capable of simultaneously distributing the to all of the remote-reading terminals to be updated is selected, taking account on the one hand of the transmission range areas of the access points and, on the other hand, of the locations of the remote-reading terminals relative to these transmission range areas.

In this example of embodiment, the distribution access points selected for distributing the update data, correspond to the two access points $P_1$ and $P_3$, excluding the access point $P_2$, because the transmission range areas $Z_{P1}$ and $Z_{P3}$, respectively associated with the access points $P_1$ and $P_3$, make it possible to cover and reach all of the remote-reading terminals $T_1$ to $T_9$ to be updated. This selection makes it possible to limit the number of distribution access points $P_1$ to $P_3$ used for simultaneously transmitting the update data. Advantageously, this makes it possible to reduce the congestion of the radio spectrum during the transmission of the update data.

The distribution access points $P_1$ and $P_3$ then receive, from the management server 1, a notification message informing them that they have been selected as distribution access points used for distributing the update data. The notification message comprises the distribution of the update data start time, in the form of a datestamp. The management server 1 then transmits the update data to the selected access points $P_1$ and $P_3$, so that in their turn they can, at the predetermined distribution start time, transmit the update data to the remote-reading terminals $T_1$ to $T_9$ to be updated.

In order to guarantee good reception of these data, the selected distribution access points $P_1$ and $P_3$ transmit the update data several times consecutively to the remote-reading terminals $T_1$ to $T_9$ to be updated. Advantageously, the transmission is carried out five times consecutively. This makes it possible to correct update data that may have become corrupted during the radio transmissions.

Once the update data has been received, each remote-reading terminal $T_1$ to $T_9$ to be updated, having received the updates, switches of its radio communication means, checks the integrity of the update data received and then writes that data into its internal memory.

Figure 2:
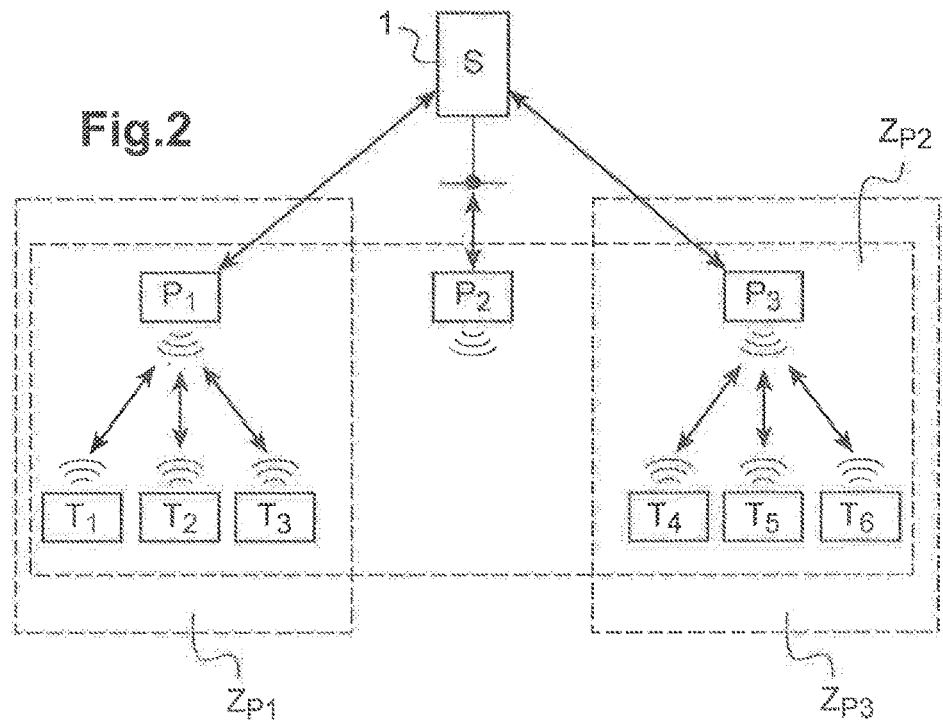
FIG. 2 shows an example of a remote-reading installation according to a second embodiment of the invention.

In a second example of embodiment, with reference to FIG. 2, the remote-reading installation comprises six remote-reading terminals $T_1$ to $T_6$ to be updated and three access points $P_1$ to $P_3$. A first group of remote-reading terminals $T_1$ to $T_3$ is associated, in a way equivalent to that which was carried out in the example of embodiment referring to FIG. 1, with the first access point $P_1$, because of their presence in the transmission range area $Z_{P1}$ of the access point $P_1$. This association allows the first group $T_1$ to $T_3$ to communicate by radio link with their associated access point $P_1$, in order to transmit remote-reading data. A second group of remote-reading terminals $T_4$ to $T_6$ is associated with a second access point $P_3$. Moreover, according to this example of embodiment, one access point $P_2$ of the installation is not associated with any remote-reading terminal $T_1$ to $T_6$ of the installation, despite the remote-reading terminals $T_1$ to $T_6$ being included in its transmission range area $Z_{P2}$. However, the management server 1 selects, during the selection of the access points used for the distribution of the update data, the access point $P_2$ which is not associated with any remote-reading terminal $T_1$ to $T_6$, for transmitting the update data. In fact, because all of the remote-reading terminals $T_1$ to $T_6$ are included in the transmission range area $Z_{P2}$ of the terminal $P_2$, the congestion of the radio spectrum is advantageously reduced during the transmission of the update data, since the update data can be transmitted simultaneously to all of the remote-reading terminals $T_1$ to $T_6$ to be updated, by selecting a limited number of access points, in this instance a single access point $P_2$.

In this example of embodiment, it is apparent that a distribution access point $P_2$ can be an access point not associated with any terminal $T_1$ to $T_6$ of the installation. It is moreover apparent that it is possible for an access point $P_1$ or $P_3$ associated with remote-reading terminals $T_4$ to $T_6$ to be updated not to be selected as a distribution access point for distributing the update data.

The invention claimed is:

1. A method of managing a software update of a plurality of remote reading terminals to be updated in a remote-reading installation, the remote-reading installation comprising a plurality of access points, the plurality of access points being configured to: (1) communicate by radio link with the plurality of remote-reading terminals to be updated, and (2) communicate with a management server of the remote-reading installation by an intermediary of a telecommunication network, where each remote reading terminal of the plurality of remote-reading terminals to be updated is associated with an access point of the plurality of access points in order to transmit of remote-reading data to the management server, the method comprising the steps of:
    (a) transmitting a message for planning reception of update data to the plurality of remote-reading terminals to be updated by the intermediary of their associated access points, the planning message comprising a start time for distribution of the update data;
    (b) selecting a set of access points among the plurality of access points to limit the number of access points used for distributing the update data, while allowing the reception of the update data by the plurality of remote-reading terminals to be updated; and
    (c) transmitting the update data by the selected set of access points, at the distribution start time,
    wherein step (b) comprises selecting a minimum number of access points for transmitting the updates to all of the remote-reading terminals to be updated simultaneously, the selection of the minimum number of access points being based on transmission range areas of the access points and locations of the remote-reading terminals relative to the transmission range areas, such that the transmission range areas of the minimum number of access points cover the remote-reading terminals.

2. The management method as claimed in claim 1, wherein step (b) comprises the transmission of a message of notification of the selection to each access point of the selected set of access points, the notification message comprising the distribution start time.

3. The management method as claimed in claim 1, wherein during step (a), each terminal of the plurality of remote-reading terminals to be updated transmits an acknowledgement message to its associated access point in order to confirm the planning of the reception of the update data at the distribution start time.

4. The management method as claimed in claim 1, wherein step (c) is carried out several times consecutively.

5. The management method as claimed in claim 3, wherein step (a) is carried out, for each remote-reading terminal of the plurality of remote-reading terminals to be updated, consecutive to the reception by its associated access point of remote-reading data transmitted by the remote reading terminal.

6. A remote-reading installation comprising:
- a management server having a hardware microprocessor and memory;
- a plurality of remote-reading terminals to be updated; and
- a plurality of access points;
- the plurality of access points being configured to:
  - communicate by radio link with the plurality of remote-reading terminals to be updated; and
  - communicate with the management server by an intermediary of a telecommunication network;
- each remote-reading terminal of the plurality of remote-reading terminals to be updated being associated with an access point of the plurality of access points for transmitting remote-reading data to the management server;
- the management server being configured to control transmission of a message for planning reception of update data to the plurality of remote-reading terminals to be updated, by the intermediary of their associated access points;
- the planning message comprising an update data distribution start time;
- the management server being configured to select a set of access points from among the plurality of access points to limit the number of access points used for distributing the update data, while allowing the reception of the update data by the plurality of remote reading terminals to be updated; and
- the set of access points selected by the management server being configured to transmit the update data at the distribution start time,
- wherein selecting a set of access points further comprises selecting a minimum number of access points for transmitting the update data to all of the remote-reading terminals to be updated simultaneously, the selection of the minimum number of access points being based on transmission range areas of the access points and locations of the remote-reading terminals relative to the transmission range areas, such that the transmission range areas of the minimum number of access points cover all of the remote-reading terminals to be updated.

7. The remote-reading installation as claimed in claim 6, wherein the management server is further configured to transmit a message of notification of the selection to each access point of the selected set of access points, the notification message comprising the distribution start time.

8. The remote-reading installation as claimed in claim 6, wherein, when the message for planning the reception of update data is transmitted to the plurality of remote-reading terminals to be updated, each terminal of the plurality of remote-reading terminals transmits an acknowledgement message to its associated access point in order to confirm the planning of the reception of the update data at the distribution start time.

9. The remote-reading installation as claimed in claim 6, wherein the set of access points is further configured to transmit the update data at the distribution start time step several times consecutively.

10. The remote-reading installation as claimed in claim 8, wherein the message for planning the reception of update data is transmitted for each remote-reading terminal of the plurality of remote-reading terminals to be updated, consecutive to the reception by its associated access point of remote-reading data transmitted by the remote reading terminal.

* * * * *